LEONCIO T. ANG
RALPH W. CARP
WILLIAM E. HOWARD
MICHAEL SLAVIN
INVENTORS

BY William G. Christoforo

ATTORNEY

TYPICAL SYSTEM PERFORMANCE CHARACTERISTICS

LEONCIO T. ANG
RALPH W. CARP
WILLIAM E. HOWARD
MICHAEL SLAVIN
INVENTORS

United States Patent Office 3,455,411
Patented July 15, 1969

3,455,411
AUTOMOBILE SPEED CONTROL
Ralph W. Carp, William E. Howard, Michael Slavin, and Leoncio T. Ang, Baltimore, Md., assignors to The Bendix Corporation, Baltimore, Md., a corporation of Delaware
Filed Oct. 24, 1967, Ser. No. 677,697
Int. Cl. B60k 31/00
U.S. Cl. 180—105                    26 Claims

ABSTRACT OF THE DISCLOSURE

A automobile speed control system wherein a voltage proportional to actual vehicle speed is fed through a low-loss memory capacitor to a comparator high input impedance port, momentary referring of which to a predetermined voltage impresses the vehicle instantaneous speed across the capacitor in the form of a command speed voltage. Thereafter, changes in vehicle speed cause the voltage at the comparator input port to change in accordance therewith, although the voltage across the capacitor remains constant. A voltage proportional to throttle position is applied through a feedback shaping circuit to the second comparator input port. The feedback circuit utilizes a D.C. feedback circuit paralleled by an A.C. feedback circuit to increase the throttle feedback signal when the throttle is moving. The error signal developed in the comparator is amplified and applied to a vacuum motor which, through a linkage, positions the throttle. A capacitor and resistance network may be switched into the comparator so as to vary the high input impedance port circuit voltage proportional to actual vehicle speed in accordance with the time constant of the network in such a manner as to cause the apparent vehicle speed to decrease, thereby causing the vehicle to accelerate at a predetermined rate. Control system turn-off circuitry is provided which temporarily disables the error signal amplifier whenever a turn-off voltage is applied thereto. This turn-off voltage may be applied by an operator controlled switch which simultaneously places the memory capacitor in condition to record the instantaneous vehicle speed in the form of a command speed signal when the turn-off voltage is removed, thereby allowing the operator to cause the vehicle to decelerate to a new, lower command speed. Turn-off voltage may also be supplied through a brake operated switch. The control system is programmed to respond to voltage levels which are caused to appear at a system control point whenever the control point is shunted to ground through various resistances. These resistances are mounted on the vehicle steering column, thereby allowing all operator initiated functions to be controlled through a single wire.

Cross references to related applications

This invention employs several components of the type generally disclosed in pending application Ser. No. 550,744, filed May 17, 1966 now Patent No. 3,381,771 and Ser. No. 597,789, filed Nov. 29, 1966 which are assigned to the assignee in the present application.

Background of the invention

Electronic automobile speed control systems have been disclosed wherein an electrical signal proportional to actual vehicle speed, an electrical signal proportional to a command vehicle speed, and an electrical signal proportional to throttle position are combined to generate an error signal which is applied to position the throttle so as to make actual vehicle speed equal to command vehicle speed. Further improvements have been disclosed which utilize a memory in the form of low-loss capacitor which couples the actual vehicle speed signal to a high input impedance port of the error signal generator. The command speed signal is stored in the memory by momentarily referring the common terminal between the memory and error signal generator to a given voltage, the command signal being the instantaneous magnitude of the actual vehicle speed signal. Logic circuits were also disclosed which inactivate the speed control system whenever the automobile brakes are applied. The commercial success of these electronic speed control systems has been due to their conveniently small size and low cost. It is now desired to further improve the electronic speed control systems so as to accomplish functions heretofore impossible to be performed by other systems.

Summary of the invention

Accordingly, an improved electronic automobile speed control system with a memory for recording command speed has been devised. Circuitry has been added to the memory to cause the apparent actual vehicle speed signal to indicate a decrease in vehicle speed in order to cause the vehicle to accelerate when the operator so desires. Additional circuitry has been added to cause the vehicle to decelerate when the operator so desires. At the end of the accelerate or decelerate period the then actual vehicle speed signal is impressed automatically on the memory as a command speed signal.

Fail-safe circuitry has been incorporated into the speed control system of this invention which prevents actuation of the system whenever open circuit failures occur in the brake harness. Another fail-safe circuit automatically deactivates the control system whenever actual vehicle speed drops substantially below command speed, thereby providing a redundant deactivating signal should the system deactivating signal, normally produced by a brake switch at the instant the brakes are applied, fail.

A special feedback circuit having both A.C. and D.C. feedback paths has been inserted into the control system. This produces a moving throttle position feedback signal approximately twice the magnitude of the throttle feedback signal when the throttle is stationary resulting in smoother pull-in of the throttle when the control system is activated and resultant closer speed control.

Operator controlled functions of the speed control system are initiated by switches which are most conveniently located on the steering wheel or the steering column. Normally, the increased versatility of the present system would require extensive wiring between the steering wheel mounted switches and the electronic package which is most conveniently located at the fire wall or under the hood; however, a level switching circuit has been added which basically includes a number of transistors which are programmed to initiate the various functions of the speed control system in response to a voltage appearing at a common control point. This voltage is applied through a single wire between the control point and the steering wheel mounted switches, the various switches being actuated by the operator to set up the proper predetermined voltage at the control point.

Description of the preferred embodiment

Figure 1:
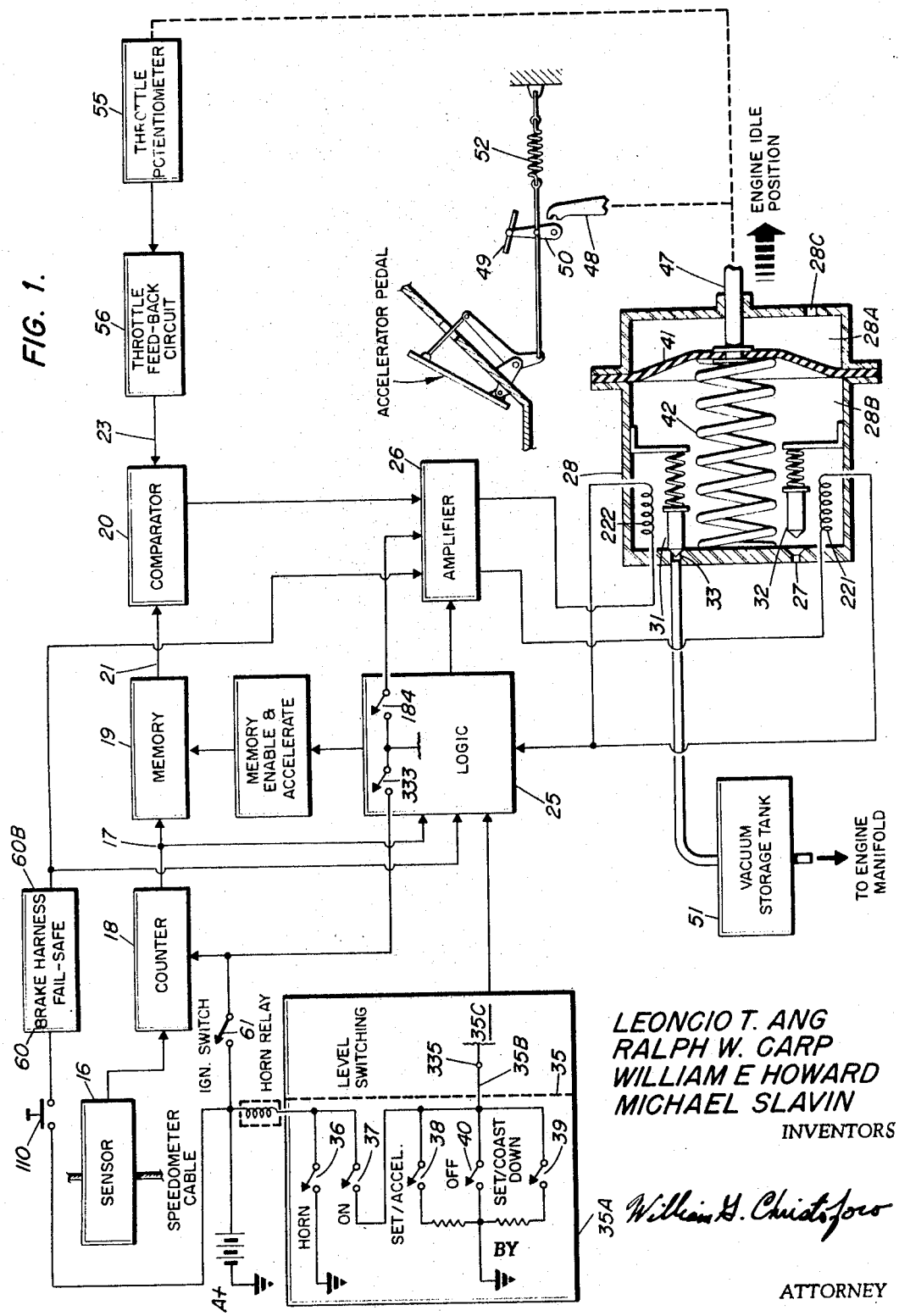
FIG. 1 is a functional block diagram of the speed control system of the invention.

Referring to FIG. 1, a sensor 16 is connected into the speedometer cable and driven at the same speed as the speedometer. Since the gear ratio between the drive wheel and the speedometer cable is fixed, the sensor output frequency is proportional to the automobile speed. The sensor drives a counter 18, which generates a D.C. voltage level proportional to the same signal input frequency. The output of counter 18 is, therefore, a D.C. voltage level proportional to vehicle speed. The counter output drives through memory 19 into a high input impedance comparator 20. The vehicle operator can impress a command speed signal proportional to the instantaneous speedometer indicated speed of the automobile by momentarily depressing set/accelerate pushbutton 38 or set/coast down pushbutton 39 of level switching circuit 35. Pushbuttons 36, 37, 38, 39 and 40 are normally mounted directly on the steering wheel. It will be noted that speed control pushbuttons 37, 38, 39 and 40 initiate four separate speed control functions, in a manner to be described later, yet require only a single wire 35B leading from the steering wheel 35A to a remotely located portion of the level switching circuit 35C.

Once a command speed signal has been impressed across memory 19 any variations in vehicle speed will cause the voltage on line 21 to vary in accordance therewith. A feedback potentiometer 55, mechanically connected to throttle linkage arm 48, provides a signal voltage proportional to the position of throttle linkage arm 48. This feedback voltage is fed back through the feedback circuit 56, which, as has been stated, passes a feedback voltage, when the throttle is moving, approximately twice the magnitude of the stationary throttle feedback voltage. The feedback voltage is applied through line 23 to the second input port of comparator 20. The resultant error signal is amplified in amplifier 26, the output of which is used to control a vacuum modulator comprising solenoid valves 221 and 222 which in turn control the pressure on one side of diaphragm 41 of vacuum modulator and actuator 28. Briefly, the solenoid valves include needle valves 31 and 32 which are positioned against ports 33 and 27, respectively. In accordance with the proper driver signal either valve 31 opens so as to allow a vacuum to be drawn by vacuum storage tank 51 in modulator chamber 28B, or alternately to allow needle valve 32 to open, thereby allowing atmospheric pressure to enter chamber 28B through port 27.

The vacuum actuator includes flexible diaphragm 41 which divides the modulator and actuator into chambers 28A and 28B. Chamber 28B is leak tight and communicates in the aforementioned manner, either to the atmosphere through port 27 or to vacuum storage tank 51 through port 33. Chamber 28A is open to the atmosphere through port 28C. Spring 42 is disposed in chamber 28B and tends to urge diaphragm 41 and connecting linkage 47 to the right or to a position of engine idle. Throttle crank 50 is urged to the right by spring 52, tending to abut linkage arm 48, so as to rotate throttle 49 to a position of engine idle. While the speed system is operating, chamber 28B is exposed to sub-atmospheric pressure by the closing of valve 32 and the opening of valve 31. Diaphragm 41 moves into chamber 28B, compressing spring 42 until the reduced pressure in chamber 28B plus the spring pressure equals atmospheric pressure. Linkage 47 with arm 48 are carried by diaphragm 41 to force abutting crank 50 to the left, opening throttle 49. It may be readily seen that an operator, at any time, may increase speed by depressing the accelerator pedal. When the accelerator pedal is released, crank 50 will fall against linkage arm 48 and the speed control system will regain control.

A brake switch 110, which is closed when the brakes are applied, applies positive A+ voltage through brake harness fail-safe circuit 60 to logic circuit 25 which contains certain control transistors which are back-biased and turned off by this A+ voltage. The speed control system is thereby deenergized so that solenoid valve 32 opens and valve 31 closes allowing atmospheric air to enter chamber 28B, thereby returning linkage 47 to a position of engine idle. In like manner, brake harness fail-safe circuit 60 allows the A+ voltage to be transferred directly to line 60B whenever a failure in the brake harness occurs. Thus, in a manner identical to the shutting down of the speed control system by the closing of switch 110, the system is shut down whenever the brake harness fails.

Figure 2:
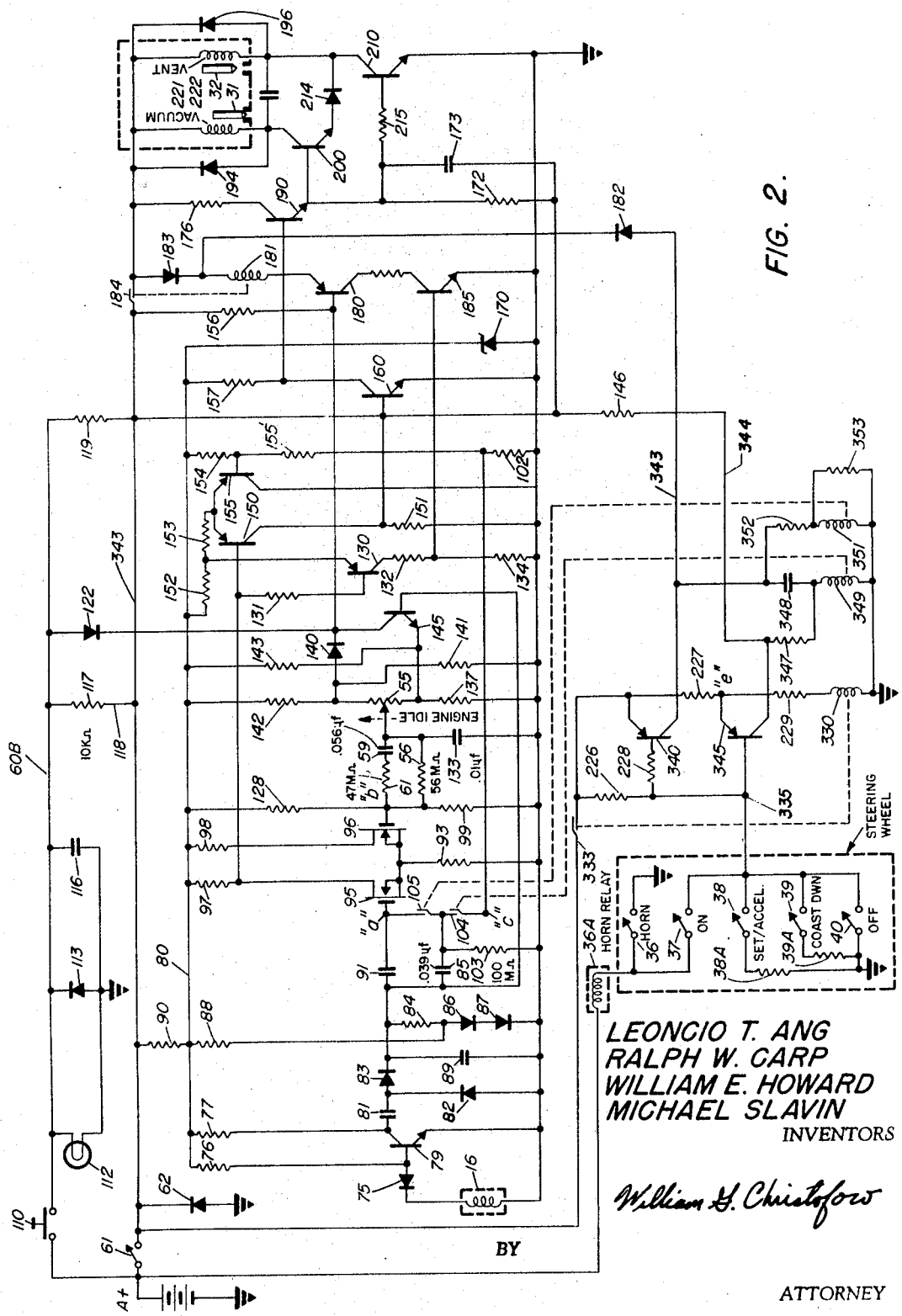
FIG. 2 is a schematic diagram of the electronic control circuitry shown in block form in FIG. 1.

Referring to FIG. 2, sensor 16 may suitably be a variable reluctance alternating current type generator providing a signal having a frequency varying directly as the rotor speed and consequently as the automobile road speed. A linear transistor 79, normally biased into saturation by resistor 76, receives the output of sensor 16 through temperature compensating diode 75. Negative half-cycles of the output of sensor 16 bias transistor 79 non-conductive. The output of transistor 79 therefore consists of positive pulses of fixed amplitude with the frequency proportional to automobile road speed. These speed pulses are applied to the counter circuit of the energy storage type comprising diodes 82 and 83 and capacitors 81 and 89. A voltage proportional to actual automobile road speed appears across capacitor 89, shunted by resistor 84 and temperature compensating diodes 86 and 87, forward biased by resistor 88.

Feedback potentiometer 55, which is connected along with resistors 142 and 137 across the A+ regulated voltage, supplies a voltage proportional to throttle position through a feedback circuit 56 as shown at FIG. 1. D.C. voltages generated by the feedback potentiometer, such as would be generated when the throttle is not moving so that the potentiometer arm is stationary, pass through resistor 56 to the gate of field effect transistor 96. A.C. voltages generated by the feedback potentiometer, such as would be generated when the wiper arm is moving, also pass through the aforementioned D.C. path, but also through the path containing capacitor and resistor 61. In a manner to be made clear, the feedback circuit operates to prevent too rapid movement of the throttle when vehicle speed is greatly below command speed, while at the same time allowing greater sensitivity of the comparator to the feedback signal as the vehicle attains command speed.

A low leakage loss memory capacitor 91 is connected between the input terminal of capacitor 89 and the gate connection of field effect transistor 95. Field effect transistors are characterized by their extremely high gate impedance, so that memory capacitor 91 is essentially open-circuited at the transistor gate connection. Point c is maintained at a low positive voltage potential by the voltage divider connected to the A+ voltage and comprised of resistors 154, 155' and 102. If point a is now connected to point c by a momentary closing of switch contacts 104 and 105, a voltage is impressed across the memory capacitor 91 equal to the voltage at that instant across capacitor 89, less the small voltage at point c. Since the voltage across capacitor 89 at the instant contacts 104 and 105 open is proportional to the automobile speed at that instant, a command speed voltage essentially proportional to actual vehicle speed at the instant the contacts open is impressed on memory capacitor 91. Since the memory capacitor is connected to the high impedance gate circuit of transistor 95, the command speed voltage impressed on memory capacitor 91 will remain practically constant after the contacts open. If the automobile speed also remains constant after the contacts 104 and 105 open, then the voltage at point a will remain constant and equal to the voltage at point c. If thereafter the automobile speed decreases, the voltage across capacitor 89 will decrease and the voltage of point a will decrease a proportional amount.

Field effect transistors 95 and 96, and resistors 93, 97 and 98 comprise a comparator in the form of a differential amplifier. Comparator output error signal is taken from the drain terminal of transistor 95 and applied to the base of transistor 150 and to the base of transistor 130. Transistors 150, 160, 190, 200 and 210 comprise an amplifier which amplifies the error signal with amplifier feedback being provided from the emitter of transistor 190 to the base of transistor 160 through the parallel combination of resistor 172 and capacitor 173. Transistor 150 is differentially connected with transistor 155 to increase the gain of this amplifier stage and to provide temperature compensation. Transistor 155 is biased conductive by resistors 152, 153, 154, 155' and 102. The constant voltage divider comprising resistors 154, 155' and 102 combined with the essentially constant diode drop across transistor 155 permit the differential amplifier emitter voltage to remain constant. The emitter of transistor 200 is connected to the collector of transistor 210 through diode 214, while transistor 210 emitter is connected directly to ground. The amplified error signal appears on the base of transistors 200 and simultaneously through resistor 215 to the base of transistor 210. Diode 214 is back biased until transistor 210 conducts; however, transistor 200 will also be cut-off until its base voltage exceeds diode 214 forward conduction voltage plus the saturation voltage of transistor 210 and its own base emitted forward voltage. Therefore, as the error signal increases transistor 210 will allow vent winding 221 to energize and close normally open vent valve 32. As the error signal increases, further, transistor 200 will allow vacuum winding 222 to energize, thereby opening normally closed vacuum valve 31, causing air to be drawn out of chamber 28B shown at FIG. 1. Diaphragm 41 moves to the left, carrying linkage 47 and arm 48 which abuts throttle crank 50, thereby causing throttle 49 to pivot to a more open position. Of course, as the error signal thereafter decreases, a reverse action takes place. The vacuum valve closes, trapping the then acquired vacuum in chamber 28B. The back E.M.F. developed by the decay voltage across winding 222 is shunted by diode 194. As the error signal further decreases, indicating that vehicle speed is greater than command speed, vent valve 32 will open, bleeding chamber 28B, causing diaphragm 41 to move to the right, to a position to cause throttle 49 to move to a less opened position. Similarly, back E.M.F. thereby generated is shunted through diode 196.

Assuming now that ignition switch 61 has been closed so that voltage regulated by Zener diode 170 appears through resistor 90 on line 80, the speed control system is turned on by momentarily depressing steering wheel mounted switch 37 thereby applying A+ voltage across horn relay 36A, resistors 226, 227 and 229, and relay winding 330. The voltage drop across horn relay 36A is not sufficient to energize it, however, relay winding 330 has sufficient turns to energize that relay, closing contacts 333, A+ voltage now being supplied through these contacts to the relay winding, thereby latching the relay in a closed condition. It will be noted that when switch 37 was depressed, A+ voltage, less the drop through horn relay 36A, appeared at control point 335, biasing transistors 340 and 345 off. After switch 37 is released and contacts 333 are latched closed, A+ voltage remains at control point 335, thereby continuing to bias these transistors off.

The actual vehicle speed signal appearing across capacitor 89 is applied to the base of multipurpose transistor 145, which in this case is operating as an amplifier, the output of which is taken from the collector and applied to the base of turn-on transistor 180. Diode 140 allows the amplifier comprising transistor 145 to change gain at a critical value of transistor base voltage as follows. At low values of transistor base voltage, corresponding to low automobile speed, transistor 145 collector voltage is high. Thus diode 140 is back-biased, so that the gain of the amplifier stage depends on the transistor emitter and collector resistors 137 and 156. In a practical circuit, resistor 156 was approximately twenty times larger than resistor 137 resulting in an amplifier gain of 20. As transistor voltage increases further, indicating an increasing automobile speed, the transistor becomes more conductive and its collector voltage drops until diode 140 becomes forward biased. Resistor 156 is now paralleled by resistor 142, thereby causing the amplifier gain to drop in accordance therewith. In the practical circuit, resistor 142 was approximately equal to resistor 141 so that the amplifier gain dropped to unity. The significance of making resistor 142 of slightly different value than resistor 141 will be shown later. The circuit elements are chosen so that at a predetermined automobile speed, known as threshold speed, diode 140 becomes forward biased and transistor 180 base voltage reaches a critical value, thereby arming transistor 180 so that if A+ voltage were applied on line 341, transistor 180 would be sufficiently conductive to energize coil 181.

If the vehicle is above the threshold speed and the speed control system is on (contacts 333 closed) the operator may tap-set the then acquired vehicle speed into the system memory so as to allow the system to maintain vehicle speed automatically. To do so, the operator momentarily depresses either set/accelerate switch 38 or set/coastdown switch 39. Assuming that the operator taps set/accelerate switch 38, voltage on control point 335 is determined, while the switch is closed, by the voltage divider consisting of resistors 226 and 38A. This voltage is still too high to permit transistor 345 to turn on, however, the additional voltage drop through resistor 228 lowers transistor 340 base voltage sufficiently so that this transistor saturates. A+ voltage appears on line 343 and is impressed through diode 182 and relay winding 181 to the emitter of transistor 180, whose base voltage it will be remembered, has reached a critical threshold value, which value is such as to cause transistor 180 to now turn on sufficiently to energize winding 181, causing relay contacts 184 to close, thereby latching the relay in the energized condition due to the A+ voltage supplied over line 343. As long as the vehicle remains over the threshold speed, so that transistor 180 remains conductive, contacts 184 will remain latched, unless OFF button 40 is depressed, the action of which will be explained below.

Simultaneously with the latching of contact 184, the initial voltage pulse on line 341 causes a voltage determined by resistors 352 and 353 to energize relay windings 351. In like manner relay winding 349 is energized through capacitor 348, but the winding is deenergized once the capacitor is charged. Since the operator has merely tapped the set/accelerate switch 38, the switch opens almost immediately, once more causing a voltage pulse to pass across capacitor 348 to energize relay winding 349. Winding 349 controls contacts 104 while winding 351 controls contacts 105. Since the voltage across winding 351 is less by the drop through resistor 352 than the drop across winding 349, contacts 105 will open first upon release of switch 38, followed shortly by the opening of contacts 104. The significance of this contact operation sequencing will be apparent when the operation of the acceleration and coast-down circuits is discussed. It will be noted, that with both contacts 104 and 105 closed, point a is connected to point c, and when contacts 105 open, a commond speed voltage equal to the voltage across capacitor 89 is now trapped across capacitor 91.

If the operator wishes to have the speed control system cause the vehicle to accelerate, he depresses the set-accelerate switch 38 and holds it down until the vehicle has accelerated to the desired speed. Release of this switch will then impress a command signal correlative to the then acquired actual vehicle across memory capacitor 91 as follows. When switch 38 is depressed, transistor 340 saturates as aforementioned, latching contacts 184 if not already latched and energizing winding 349 and 351, thereby causing contacts 104 and 105 to close. As before, winding 349, which is connected to positive D.C. voltage through capacitor 348, deenergizes as soon as capacitor 348 is charged, opening contacts 104. The gate of field effect transistor 95 is now connected to ground through the network consisting of capacitors 85 and 91 and extremely large resistor 103. The charge on the gate, therefore, slowly leaks to ground. The error signal increase in accordance therewith and the automobile accelerates, increasing the voltage across capacitor 89. Upon release of switch 38, winding 330 once more becomes energized, closing contacts 104, thereby connecting point $a$ to point $c$. This is the speed setting mode of the speed control system. Because of the aforementioned greater sensitivity of winding 349 over 351, winding 351 first deenergizes causing contacts 105 to open, thereby completing the setting of the speed command signal across capacitor 91. Winding 349 then deenergizes, opening contacts 104.

If set/coast-down switch 39 is depressed and held down, both transistors 340 and 345 are biased into saturation. Saturation of transistor 340 causes an effect similar to that caused when set/accelerate switch 38 is depressed. Additionally, the saturation of transistor 345 causes a positive voltage to appear on line 344 and hence on the base of transistor 160, causing that transistor to saturate, thereby back biasing transistors 190, 200 and 210 which cause windings 221 and 222 to become deenergized. Vacuum valve 31 closes and vent valve 32 opens, venting the vacuum actuator, causing linkage 47 of FIG. 1 to move to the right or a position of engine idle. The vehicle then coasts down. If the operator releases switch 39 while the vehicle is above the threshold speed, the then acquired speed will be set across the memory capacitor in the form of a command speed signal as follows. Upon release of switch 39, positive voltage on lines 341 and 344 disappears almost immediately; however, due to the aforementioned greater sensitivity of winding 349 contacts 105 open before contacts 104 thereby setting the command speed.

When switch 40 is depressed, control point 335 is grounded so that the voltage at point $e$ assumes a value equal to the diode drop of transistor 345. The voltage across winding 330 is no longer sufficient to hold that winding energized so previously latched contacts 333 open, thereby turning off the speed control system.

Brake switch 110 is ganged to the vehicle braking system and is closed when the brakes are applied. With switch 110 closed, a positive voltage is applied through resistor 119 to the base of transistor 160 so as to turn-off the entire control system in a manner identical to the turning-off of the system when a positive voltage is applied to transistor 160 base by the closing of switch 39. Additionally, a positive voltage is applied through diode 122 to the base of transistor 180, causing that transistor to turn off and unlatch contacts 184.

If upon application of the vehicle brakes, switch 110 should fail to close or in another manner, the speed control system should continue to function, a redundant, failsafe system disable network would be desirable. As the vehicle slows down in response to the braking action on the vehicle, the system error signal increases with resultant opening of the throttle. With the throttle wide open, so that the wiper of throttle feedback potentiometer 55 is completely toward the ground position, and the vehicle continuing to decelerate under the action of the brakes, transistor 95 will turn off causing its drain voltage to suddenly rise thereby turning off normally conductive transistor 130, its collector voltage dropping in response thereto. Since transistor 130 collector is connected to transistor 185 base, the later transistor will turn off, interrupting the current flow through winding 181 so as to unlatch contacts 184.

An additional fail-safe circuit which prevents operation of the system whenever the brake harness comprises line 118 and resistor 117. Normally, the voltage on line 60B is shunted to ground through brake lights or relay 112 so that diode 122 is not forward biased and the voltage of the base of transistor 160 supplied through resistor 119 is insufficient to affect that transistor. If now the brake harness should open, the voltage on line 60B will rise and the system will turn off in a manner similar to the turn-off caused by closing switch 110. Normally, with the brake harness in tact and brake switch 110 open, the current flow through the harness will be insufficient to energize the brake light.

Diodes 62 and 113 and capacitor 116 prevent damaging line surges which may occur.

It will be remembered that the frequency generated by sensor 16 is linearly proportional to actual vehicle speed. The voltage developed across capacitor 89, however, which is the voltage proportional to actual vehicle speed, is not linearly dependent thereon due to the inherent non-linearity of the charge-storing circuit. Multipurpose transistor 145 provides a means of varying the throttle feedback signal in response to vehicle speed to compensate for this non-linearity. The emitter to collector circuit of transistor 145 is connected across throttle feedback potentiometer 55, while a voltage proportional to actual vehicle speed is impressed on its base. As vehicle speed increases, increasing base voltage, this transistor becomes more conductive, decreasing the voltage across the potentiometer, hence also decreasing the available throttle feedback. By proper design, the roll-off of the throttle feedback can be made to compensate for the roll-off of the electrical signal proportional to vehicle speed.

It is also desirable, as will be shown, to provide a higher average feedback voltage at higher speeds for a given wiper position. As was previously explained, resistor 142 is slightly different in value than resistor 137. If resistor 142 is smaller and the potentiometer wiper position corresponding to engine idle is at the mid-point of the potentiometer winding, the average feedback voltage for a given wiper position will rise as speed increases in addition to a compression of the available total feedback voltage range. This increase in average feedback voltage could also be attained, if it was desired to make resistors 142 and 137 equal, by shifting the potentiometer wiper arm for idle engine throttle up, or in any other manner causing the resistance between wiper arm and line 80 to be less than the resistance from the wiper arm to ground at idle engine throttle so long as the other design criteria are met.

Figure 3:
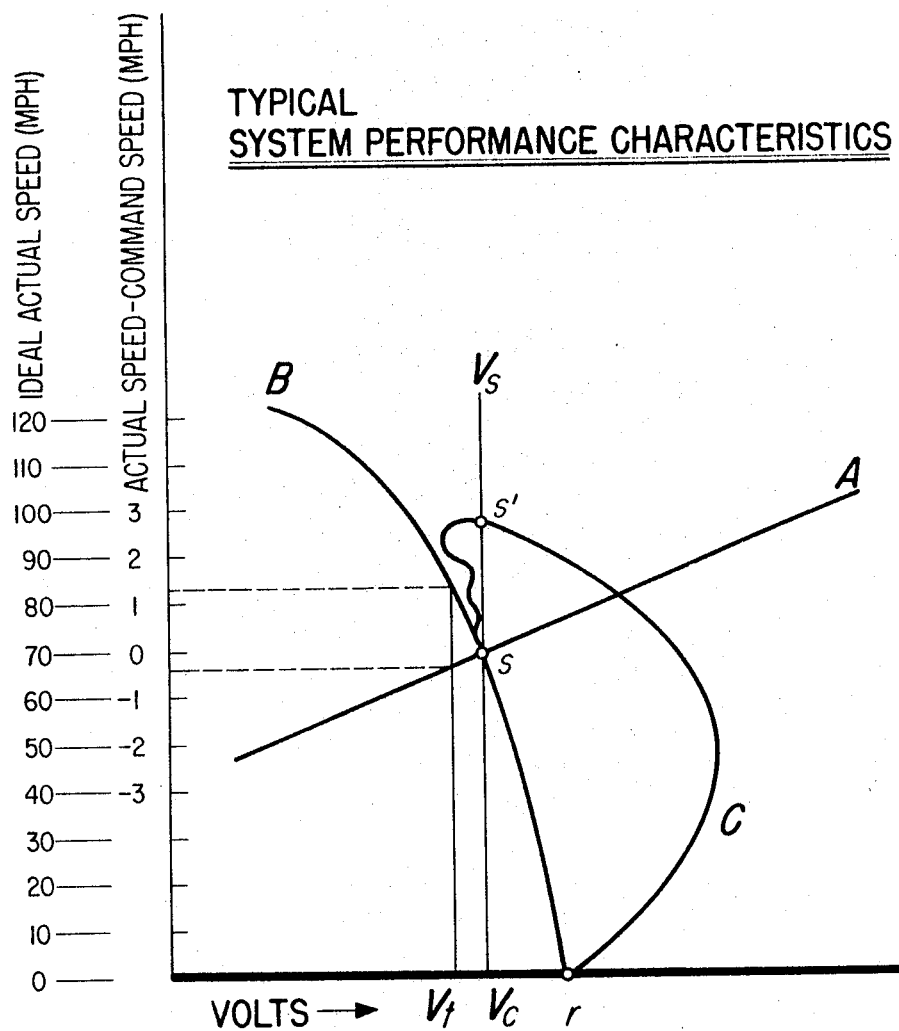
FIG. 3 is a plot of curves showing the performance characteristics of a typical system.

FIG. 3 illustrates the throttle feedback characteristics of the control system. For the purpose of interpreting the figure, ideal actual speed is defined as the speed an ideal automobile would attain at steady state conditions with a given throttle opening under unvarying engine loading and driving conditions. Curve B is a plot of ideal actual speed versus D.C. feedback voltage at point $b$ of FIG. 2 and illustrates the non-linearity of throttle setting compared with automobile speed. The D.C. feedback voltage at point $b$, of course, is indicative of throttle position. Curve A is a plot of actual speed less command speed versus voltage at point $a$ on FIG. 2 and is used as a transfer curve in conjunction with curve B. $V_c$ is the voltage at point $c$. From the previous discussion, it is apparent that the system can attain equilibrium only when the voltage at point $a$ equals the voltage at point $d$ while the throttle is stationary, that is, where constant voltage (vertical) lines intersect curves A and B.

To illustrate more fully the operation of the control system and feedback network an example will be given. Assume that an ideal vehicle is moving at 70 m.p.h. under unvarying engine loading and driving conditions with the control system inactivated. Linkage 47 and arm 48 are in a position of engine idle while the operator has overridden the system to position the throttle to maintain 70 m.p.h. Throttle feedback potentiometer wiper, which is ganged to arm 48, is also in a position of engine idle (point $r$ on FIG. 3). The operator now momentarily depresses the set/accelerate switch, thereby setting voltage $V_c$ at point $a$ of FIG. 2. If the feedback circuit were purely resistive and properly scaled, voltage at point $b$ would move along curve B toward voltage $V_c$. The difference in voltage between the potentials at points $a$ and $b$ determines the magnitude of the error signal. It should be obvious that with a purely resistive throttle feedback network, the error signal becomes very small as point $b$ voltage approaches point $a$ voltage. The new feedback network provides a means of increasing the throttle feedback before equilibrium conditions are attained thereby affording smoother pull in of the throttle. Assuming again the conditions of the first example except that a throttle feedback network as shown in FIG. 2 is used. As the throttle linkage 47 and arm 48 start to pull in throttle feedback voltage will follow along curve C which illustrates the increased throttle feedback signal from the moving feedback potentiometer wiper. When throttle feedback voltage reaches $s'$ the system is apparently balanced, the error signal goes to zero and the throttle and wiper movement cease. The A.C. component of throttle feedback disappears so that throttle feedback voltage moves toward curve B, thereby causing an error signal to be generated indicating the throttle has opened too wide so that the control system now attempts to decrease the throttle opening. The throttle feedback voltage will thereafter follow the generally sinusoidal curve from $s'$ to $s$ where equilibrium is finally attained.

Ideally constant driving conditions have been assumed. In actual operation, an automobile encounters a wide variety of driving conditions, such as wind from various directions, hills, curves and rough roads. If the automobile now starts up hill, the speed will decrease causing the voltage at point $a$ to fall. This will tend to open the throttle further. Movement of the throttle linkage and arm increase the A.C. feedback producing an apparent indication of the throttle being less open than it actually is. The error signal is therefore larger than would be possible with a resistive feedback network. In this manner, smoother control is attained while the system assumes a new equilibrium position. If the loading caused by the hill is equivalent to 10 m.p.h. additional throttle opening, the throttle must open to a new position equivalent to 80 m.p.h. ideal actual speed to maintain 70 m.p.h. The voltage at point $b$ of FIG. 2 will therefore drop to $V_t$. $V_t$ on curve A corresponds to an actual speed less command speed of —0.3 m.p.h. so that actual speed will drop to 69.7 m.p.h. to maintain the system in equilibrium. A reverse process occurs when the load on the automobile decreases, such as when the automobile goes down hill. Less throttle opening is required to maintain speed and actual speed must increase slightly to maintain equilibrium.

It will now be remembered, that the range of the feedback potentiometer as well as the value of the feedback voltage for a given throttle opening is responsive to the actual speed of the vehicle. Under the aforementioned ideal conditions, the throttle opening required to maintain the ideal vehicle at a speed of 70 m.p.h. produces a D.C. feedback voltage at point $b$ of FIG. 2 equal to point $c$ voltage. The vehicle is now controlled at 70 m.p.h., the system operating to maintain speed as previously described.

If the system is activated under ideal conditions while the ideal vehicle is moving at 50 m.p.h., transistor 145 would act to extend the potentiometer range while lowering the average feedback voltage. A throttle opening for an ideal speed of 70 m.p.h. in the previous example produced equilibrium. However, the lowering of the average feedback voltage means that the throttle need not open as far at 50 m.p.h. as at 70 m.p.h. to produce a D.C. feedback voltage at point $b$ equal to $V_c$. It can thus be seen, that by shunting diode 140 and transistor 145 across the feedback potentiometer and by the proper selection of other circuit elements, the D.C. feedback voltage at point $b$ can be made essentially equal to $V_c$ for throttle openings necessary to maintain the ideal speed then attained by the ideal vehicle under ideal conditions. Thereafter, deviations from ideal conditions will cause the vehicle to speed up or slow down slightly as previously described.

Although we have shown what we consider to be the preferred embodiment of our invention, certain alterations and modifications will become apparent to one skilled in the art.

What is claimed is:

1. In a speed control system for automobiles having throttle regulated propulsive means, said control system including means for positioning said throttle, means responsive to actual automobile speed for generating a first feedback electrical signal, means responsive to said throttle position for generating a second feedback electrical signal and electric control means including a memory capacitor and a comparator wherein said first and second signals are combined with a third electrical signal correlative to a command speed to generate an error signal for controlling said throttle positioning means, an improvement comprising:

memory enabling means having multiple operational modes, a first mode causing a command speed signal derived from and equal to the instantaneous magnitude of said first signal to be stored in said memory capacitor, thereby comprising said third electrical signal; and, an acceleration circuit connected to said memory capacitor for overriding said first signal in the direction of apparently decreasing automobile speed when said memory enabling means is in a second mode.

2. A speed control system as recited in claim 1 including a source of a reference voltage and wherein:

said comparator includes a high input impedance port connected to a first terminal of said memory capacitor, a second terminal being connected to said means for generating said first signal;

said acceleration circuit includes an RC network; and said memory enabling means comprises a switching means which in said first mode connects said memory capacitor first terminal to said reference voltage source and in said second mode connects said memory capacitor first terminal to said RC network.

3. A speed control system as recited in claim 2 with additionally:

amplifier means responsive to a disable signal connected between said comparator and said throttle positioning means for amplifying said error signal;

a source of power for energizing said throttle positioning means;

latching means responsive to a latching signal for latchably connecting said power source to said throttle positioning means; and logic circuitry including a control point and a plurality of logic transistors responsive individually to a control voltage appearing on said control point, a first of said logic transistors for applying said latching signal to said latching means and a second of said logic transistors for applying said disable signal to said amplifier means.

4. A speed control system as recited in claim 2 with additionally a source of a second reference voltage and wherein said acceleration circuit comprises:

a capacitor shuntable across said memory capacitor; and a resistor switchably connected between said memory capacitor first terminal and said source of said second reference voltage.

5. A speed control as recited in claim 4 wherein said memory enabling means includes first and second relays comprising first and second coils having their input ends capacitively coupled, said first coil input end including a means for attenuating a signal applied thereto and first and second switch contacts serially connecting said first reference voltage source to said memory capacitor first terminal, said second switch contacts being additionally adapted to disconnect said first reference voltage source and connect said acceleration circuit to said memory capacitor first terminal and additionally:

amplifier means responsive to a disable signal connected between said comparator and said throttle positioning means for amplifying said error signal;

a source of power for energizing said throttle positioning means;

latching means responsive to a latching signal for latchably connecting said power source to said throttle positioning means; and logic circuitry including:

a control point;

a plurality of logic transistors responsive individually to a control voltage appearing on said control point; a first logic transistor when conductive connecting said power source to said first coil input end and additionally connecting said power source to said latching means, said power source thereby generating said latching signal; a second logic transistor when conductive connecting said power source to said second coil input end and additionally connecting said power source to said amplifier means, said power source thereby generating said amplifier disable signal.

6. A speed control as recited in claim 5 with additionally a current responsive voltage source and means for varying the voltage on said control point comprising:

means connecting said control point to said voltage source;

a plurality of switches, each having one contact connected to said control point and the other contact resistively connected to the return circuit of said voltage source.

7. A speed control system as recited in claim 4 wherein said second reference voltage source comprises a grounded terminal.

8. A speed control system as recited in claim 4 wherein said memory enabling means comprises first and second switch contacts serially connecting said first reference voltage source to said memory capacitor first terminal, said second switch contact being adapted to disconnect said first reference voltage source and connect said acceleration circuit to said memory capacitor first terminal.

9. A speed control system as recited in claim 8 with additional means for opening said second switch contacts after a predetermined time.

10. A speed control system as recited in claim 8 wherein said memory enabling means additionally includes:

first means for controlling said first switch contacts; and second means for controlling said second switch contacts, said second means being adapted to respond with greater sensitivity to an actuating signal than said first means.

11. A speed control system as recited in claim 1 with additionally:

a throttle feedback shaping circuit connected between said means for generating a second signal and said comparator comprising:

a first electrical path conductive to D.C. components of said throttle position feedback signal, a parallel connected second electrical path conductive to A.C. components of said throttle position feedback signal.

12. In a speed control system as recited in claim 11 wherein said automobiles additionally have brakes and brake harness, said control system additionally having:

a source of electrical power;

means responsive to said first electrical signal for generating a threshold signal;

means for generating a latching signal;

latching means dependently responsive to said threshold and latching signals for connecting said power source to said throttle positioning means;

first unlatching means responsive to an unlatching signal for interrupting current flow through said latching means;

means responsive to said brakes for generating a first said unlatching signal;

means responsive to the condition of said brake harness for generating a second said unlatching signal;

a second unlatching means responsive to said error signal for interrupting current flow through said latching means, amplifier means connected between said comparator and said throttle positioning means for amplifying said error signal;

switching means for disabling said amplifier;

a throttle feedback shaping circuit connected between said means for generating a second signal and said comparator having a first electrical path conductive to throttle feedback components correlative to throttle position and a second electrical path conductive to throttle feedback components correlative to speed of throttle movement; and wherein said means for generating a second electrical signal comprises:

a current responsive voltage source;

a potentiometer connected across said voltage source and ganged to said throttle;

a transistor responsive to said first electrical signal; and a diode, said transistor and said diode being connected across said potentiometer, the output of said potentiometer being connected to said comparator through said feedback shaping network.

13. In a speed control system for automobiles having throttle regulated propulsive means, an ignition switch, brakes and brake harness, said control system including means for positioning said throttle, means responsive to actual automobile speed for generating a first feedback electrical signal, means responsive to said throttle position for generating a second feedback electrical signal, means responsive to said throttle position for generating a second feedback electrical signal, means for generating a third electrical signal correlative to a command speed and a comparator wherein said first, second and third electrical signals are combined to generate an error signal for controlling said means for positioning said throttle, an improvement comprising:

a throttle feedback shaping circuit connected between said means for generating a second signal and said comparator comprising:

a first electrical path conductive to throttle feedback components correlative to throttle position; and, a second electrical path conductive to throttle feedback components correlative to speed of throttle movement.

14. A speed control system as recited in claim 13 wherein:

said first electrical path comprises an impedance network having a 0° phase angle; and, said second electrical path comprises an impedance network having a non-0° phase angle.

15. A speed control system as recited in claim 13 wherein said means for generating a second signal comprises:

a current responsive voltage source;

a potentiometer connected across said voltage source; and, variable impedance means responsive to said first electrical signal connected across said potentiometer.

16. A speed control system for automobiles having throttle regulated propulsive means, said control system including means for positioning said throttle, means responsive to actual automobile speed for generating a first feedback electrical signal, means responsive to throttle position for generating a second feedback electrical signal, means for generating a third electrical signal correlative to a command speed and a comparator wherein said first, second, and third electrical signals are combined to generate an error signal for controlling said throttle positioning means wherein said means for generating a second electrical signal comprises:
- a current responsive voltage source;
- a potentiometer connected across said voltage source, and ganged to said throttle; and
- a transistor responsive to said first electrical signal connected across said potentiometer, the output terminal of said potentiometer being connected to said comparator.

17. A speed control system as recited in claim 16 wherein said current responsive voltage source comprises:
- a voltage source;
- a first resistor connected at one end to said voltage source power terminal; and
- a second resistor connected at one end to said voltage source return terminal, the output of said current responsive voltage source being taken across the free ends of said first and second resistors.

18. A speed control system as recited in claim 17 wherein said first resistor differs in value from said second resistor.

19. A speed control system as recited in claim 17 wherein the resistance between said potentiometer output terminal and said voltage source power terminal differs from the resistance between said potentiometer output terminal and said voltage source return terminal when said throttle is in an idle engine position.

20. A speed control system as recited in claim 17 wherein said transistor collector-emitter circuit is connected across said potentiometer and said transistor base electrode is connected to said means for generating a first electrical signal and with additionally:
- a diode connected in the collector circuit of said transistor;
- a third resistor connected between said voltage source power terminal and said transistor collector;
- means for energizing said throttle positioning means; and
- latching means responsive to said transistor collector voltage for arming itself and having contacts adapted to switchably connect said energizing means to said throttle positioning means;
- means for applying a latching signal to said latching means; and
- means applying a latching signal to said latching means from said energizing means when said contacts are closed.

21. A speed control system for automobiles having a throttle regulated propulsive means, brakes and a brake harness, said control system including means for positioning said throttle, means responsive to actual automobile speed for generating a first feedback electrical signal, means responsive to throttle position for generating a second feedback electrical signal, means for generating a third electrical signal correlative to a command speed and a comparator wherein said first, second and third electrical signals are combined to generate an error signal for controlling said throttle positioning means, a power source, and self-latching means for switchably applying power to said throttle positioning means, said latching means comprising:

- a latching relay having contacts adapted to switchably connect said power source to said throttle positioning means and having one end of its coil connected to said power source when said contacts are closed;
- means responsive to said first electrical signal for generating a threshold signal;
- transistor responsive to said threshold signal for connecting the free end of said coil to the return circuit of said power source to complete the circuit therethrough;
- means for applying a latching voltage across said coil; and
- first unlatching means responsive to an unlatching signal for interrupting the current through said coil when latched, said threshold signal when below a threshold value comprising a first unlatching signal.

22. A speed control system as recited in claim 21 wherein said means for generating a threshold signal comprises a dual gain amplifier responsive to and for amplifying said first electrical signal, said amplifier output being said threshold signal.

23. A speed control system as claimed in claim 21 with additionally a switching means ganged to said brakes for applying a second unlatching signal to said first unlatching means.

24. A speed control system as recited in claim 23 wherein said brake harness comprises a low impedance circuit energized by said switching means and additionally a high impedance power source for applying a third unlatching signal to said first unlatching means when an open fault occurs in said brake harness, said brake harness being normally connected to bleed said high impedance power source to a low voltage.

25. A speed control system as recited in claim 24 with additionally:
- amplifier means responsive to a disable signal to disable itself and connected between said comparator and said throttle positioning means for amplifying said error signal; and
- means coupling said second and third unlatching signals to said amplifier means, said second and third unlatching signals thereby comprising amplifier disable signals.

26. A speed control system as recited in claim 25 with additionally second unlatching means responsive to a predetermined value of said error signal for interrupting the current through said relay coil.

References Cited

UNITED STATES PATENTS

| | | | |
|---|---|---|---|
| 2,980,369 | 4/1961 | Ruof | 317—5 X |
| 3,060,602 | 10/1962 | Buttenhoff | 180—105 X |
| 3,070,185 | 12/1962 | Fales. | |
| 3,116,807 | 1/1964 | Wilson | 180—109 |
| 3,172,497 | 3/1965 | Stoner et al. | |
| 3,198,985 | 8/1965 | Haskell. | |
| 3,319,733 | 5/1967 | Rath et al. | 180—106 |
| 3,409,102 | 11/1968 | Neapolitakis et al. | 180—109 |

KENNETH H. BETTS, Primary Examiner

U.S. Cl. X.R.

123—102; 180—109; 317—148.5